United States Patent [19]

Martin

[11] Patent Number: 4,634,726

[45] Date of Patent: Jan. 6, 1987

[54] CUSHION STOCK FOR POWER TRANSMISSION BELTS

[75] Inventor: Billy P. Martin, Lincoln, Nebr.

[73] Assignee: The Goodyear Tire & Rubber Company, Akron, Ohio

[21] Appl. No.: 560,777

[22] Filed: Dec. 12, 1983

[51] Int. Cl.$^4$ ................................................ C08J 5/15
[52] U.S. Cl. ........................................ 524/34; 524/95; 524/100; 524/262; 524/263; 524/265; 524/267
[58] Field of Search ................ 524/94, 95, 34, 100, 524/262, 263, 265, 267; 474/263, 265

[56] References Cited

U.S. PATENT DOCUMENTS

| 3,370,051 | 2/1968 | Sullivan et al. | 252/352 |
| 3,541,872 | 11/1970 | Fix et al. | 524/34 |
| 3,638,702 | 2/1972 | Endter | 524/512 |
| 3,661,823 | 5/1972 | Fix et al. | 524/34 |
| 3,938,574 | 2/1976 | Burmester et al. | 524/262 |
| 3,992,334 | 11/1976 | Harvey | 524/512 |
| 4,038,220 | 7/1977 | Thompson | 524/512 |
| 4,338,263 | 7/1982 | Elmer | 524/100 |
| 4,339,359 | 7/1982 | Bezwado | 524/512 |

FOREIGN PATENT DOCUMENTS 0050993  5/1982  European Pat. Off. .

OTHER PUBLICATIONS

Degussa publication, Si 230 & X 230-S, 8/9/1982.
Degussa brochure, PT 41-3-2-581, Apr. 1981.
"Rubber Chem. Lines", American Cyanamide Co., vol. 22, No. 5, Oct. 1973.

Primary Examiner—James J. Bell
Attorney, Agent, or Firm—Marc R. Dion, Sr.

[57] ABSTRACT

Power transmission belts have a cushion stock which improves the durability of the belts. The cushion stock contains a melamine and a silane and preferably cotton reinforcement and silica. 2-thiazolidinethiones can be used as accelerators in the cushion stocks.

24 Claims, No Drawings

CUSHION STOCK FOR POWER TRANSMISSION BELTS

TECHNICAL FIELD

This invention relates to cushion stocks for power transmission belts, power transmission belts containing said cushion stocks and a process for improving the durability of said belts.

BACKGROUND ART

This invention relates to flexible power transmission belts and the cushion stocks used therein. Any power transmission belt with a cushion stock will benefit by the practice of the present invention, whether it be a power drive belt, a V-belt, a multi-ribbed V-belt, or any other type of power transmission belt. Power transmission belts which will benefit by the practice of the present invention include, but are not limited to the belts described and illustrated in U.S. Pat. No. 2,057,852; 3,404,576; 3,404,577; 3,416,383; 3,643,518; 3,667,308; 3,951,006; 4,213,350; and 4,342,561. A belt which particularly benefits by the practice of the present invention is the multi-ribbed V-belt.

These well known belts are characterized by such basic elements as a tensile member composed of a rubber insulated cord layer and a cushion member. Often the belt is covered by a rubberized fabric envelope which covers the entire surface of the belt. As a result of the severe operating conditions to which belts are often subjected, the resistance of the belts to failure due to flexing has become increasingly important. Flexing is particularly severe with multi-ribbed transmission belts. In particular, the higher temperature environments, such as are found in the engine compartments of automobiles, have a detrimental effect on the useful life of a belt. It is, therefore, desirable to improve the durability of these belts, especially where higher operating temperatures are likely to be found.

DISCLOSURE OF THE INVENTION AND BEST MODE

The present invention relates to power transmission belts with improved durability, a cushion stock which will improve the durability of said belts and a process for improving the durability of power tranmission belts.

Some aspects of the present invention are accomplished by combining a melamine and an organosilane with a rubbery diene polymer composition, preferably rich in polychloroprene, which is preferably of the well known sulfur-modified type (U.S. Pat. No. 3,370,051, column 1, line 71 to column 2, line 4). This composition can then be used in the cushion stock of a power transmission belt to improve the durability thereof. Preferably the cushion stock also contains silica and/or cotton fibers, most preferably both silica and cotton fibers. Cotton flock is preferred over other types of cotton fibers.

Any conventional vulcanization system can be used. Preferred as acclerators when polychloroprene-rich compositions are used in the cushion stock are the 2-thiazolidinethiones.

In a preferred embodiment the cushion stock contains 85 to 100 parts by weight of polychloroprene per 100 parts by weight of total elastomer. The remaining elastomer can be any conventional rubbery diene polymer. Most preferably the elastomeric portion of the cushion stock consists essentially of polychloroprene, i.e., the rubbery polymer of 2-chlorobutadiene-1,3. This material is designated as ASTM D-1418-56T at (C).

Rubbery diene polymers which are used in combination with the polychloroprene include natural rubber, such as crepe rubber, and synthetic rubbers such as homopolymers of a conjugated 1,3-diene such as isoprene and butadiene, and in particular, polyisoprenes and polybutadienes having essentially all of their repeating units combined in a cis-1,4 structure; copolymers of a conjugated 1,3-diene such as isoprene and butadiene with up to 50 percent by weight of at least one copolymerizable monomer such as styrene and acrylonitrile; and polymers of monoolefins containing unsaturation, i.e., carbon to carbon double bonds, such as terpolymers of ethylene, propylene and a nonconjugated diene.

The melamines used in the practice of the present invention are N-(substituted oxymethyl)melamines having the following structural formula:

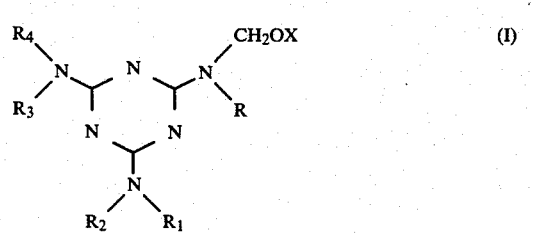

wherein X is selected from the group consisting of hydrogen and alkyl radicals having 1 to 8 carbon atoms, preferably alkyl radicals having 1 to 6 carbon atoms, most preferably alkyl radicals having 1 to 4 carbon atoms, R, $R_1$, $R_2$, $R_3$ and $R_4$ are selected from the group consisting of hydrogen, alkyl radicals having 1 to 8 carbon atoms, preferably alkyl radicals having 1 to 6 carbon atoms, most preferably alkyl radicals having 1 to 4 carbon atoms and $-CH_2OX$ wherein X is as defined above.

Representative of, but not limiting the melamines of the present invention are the following compounds:
hexakis(methoxymethyl)melamine,
N,N',N"-trimethyl-N,N',N"-trimethylolmelamine,
hexamethylolmelamine,
N,N',N"-trimethylolmelamine,
N-methylolmelamine,
N,N-dimethylolmelamine,
N,N',N"-tri(methoxymethyl)melamine, and
N,N',N"-tributyl-N,N,N"'-trimethylolmelamine.
A preferred melamine is hexakis(methoxymethyl)melamine.

The melamines used in accordance with the practice of this invention are used at a level of at least 0.2 parts, preferably at least 0.4 parts, most preferably at least 0.5 parts. The maximum level is 8 parts. Preferably the maximum is 6 parts, more preferably 3 parts, and most preferably the maximum level is 1.5 parts, all parts being by weight per 100 parts of elastomer.

The melamine compounds used in the practice of the present invention are well known and are readily prepared by the reaction of melamine with formaldehyde. The resulting N-methylolmelamine compounds are then optionally etherified with an appropriate lower alcohol.

The organosilanes used in the practice of the present invention have the following structural formulae:

wherein R is selected from the group consisting of alkyl radicals having 1 to 9 carbon atoms, preferably alkyl radicals having 1 to 6 carbon atoms, most preferably alkyl radicals having 1 to 4 carbon atoms, alkenyl radicals having 1 to 9 carbon atoms, preferably alkenyl radicals having 1 to 6 carbon atoms, most preferably alkenyl radicals having 1 to 4 carbon atoms, and alkoxy radicals having 1 to 9 carbon atoms, preferably alkoxy radicals having 1 to 6 carbon atoms, most preferably alkoxy radicals having 1 to 4 carbon atoms. X is selected from the group consisting of chloro, chloroalkyl radicals having 1 to 9 carbon atoms, preferably chloroalkyl radicals having 1 to 6 carbon atoms, most preferably chloroalkyl radicals having 1 to 4 carbon atoms, aminoalkyl radicals having 1 to 9 carbon atoms, preferably aminoalkyl radicals having 1 to 6 carbon atoms, most preferably aminoalkyl radicals having 1 to 4 carbon atoms, and cycloalkenyl radicals having 6 to 8 carbon atoms, wherein n=1, 2 or 3; and $$(R_3SiX)_2S_m \qquad (III)$$

wherein R and X are as defined above; and m=1 to 4. Representative of, but not limiting the organosilanes of the present invention, are the following compounds:
cis-2-butenyltriethoxysilane,
2,6-octadienyltriethoxysilane,
[2-(3-cyclohexenyl)-ethyl]triethoxysilane,
tris(2-methoxyethoxy)vinylsilane,
bis-(3-[triethoxysilyl]-propyl)-tetrasulfide,
bis-(3-[triethoxysilyl]-propyl)-disulfide,
3-(triethoxysilyl)-1-propanamine,
chloropropyltriethoxysilane.

Preferred are bis-(3-[triethoxysilyl]-propyl)tetrasulfide, bis-(3-[triethoxysilyl]-propyl)-disulfide and chloropropyltriethoxysilane. Most preferred is chloropropyltriethoxysilane.

The organosilanes used in accordance with the practice of this invention are used at a level of at least 0.2 parts, preferably at least 0.4 parts, most preferably at least 0.5 parts. The maximum level is 4 parts. Preferably the maximum is 2.5 parts. Most preferably the maximum level is 1.5 parts, all parts being by weight per 100 parts of elastomer.

The compounds of structural formula II are illustrated by Degussa Corporation's Si230 and X 230-S referred to in Degussa's Technical Information brochure dated August and September, 1982.

The compounds of structural formula III are illustrated by Si69 in Degussa's brochure PT 41-3-2-581.

The thiazoldines used in the practice of the present invention have the following structural formula:

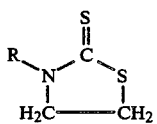

wherein R is selected from the group consisting of alkyl radicals having 1 to 4 carbon atoms, cycloalkyl radicals having 6 to 8 carbon atoms, aryl radicals having 6 to 10 carbon atoms, aralkyl radicals having 7 to 11 carbon atoms, furfuryl and morpholinoalkyl radicals, the alkyl portion of which contains 1 to 2 carbon atoms and

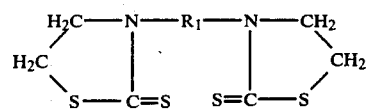

wherein $R_1$ is selected from the group consisting of alkylene radicals having from 1 to 4 carbon atoms, cyclohexylene and phenylene.

Representative of, but not limiting the thiazolidines of the present invention are the following compounds:
3-methylthiazolidine-thione-2,
3,3'-ethylenebis(thiazolidine-thione-2),
3-ethylthiazolidine-thione-2,
3-phenylthiazolidine-thione-2,
3,3'-methylenebis(thiazolidine-thione-2),
3-0-tolylthiazolidine-thione-2,
3-p-tolylthiazolidine-thione-2,
3-morpholinormethylthiazolidine-thione-2, and others as listed in U.S. Pat. No. 3,370,051 at column 3, lines 21 to 49. Methods of preparation of the thiazolidines are described in the forementioned patent at column 2, line 48, to column 3, line 2.

Preferred is 3-methylthiazolidine-thione-2.

The thiazolidines used in accordance with the practice of this invention are used at a level of at least 0.2 parts, preferably at least 0.4 parts, most preferably at least 0.5 parts. The maximum level is 2.5 parts. Preferably the maximum is 1.8 parts. Most preferably the maximum level is 1.5 parts, all parts being by weight per 100 parts of elastomer.

Any conventional vulcanization system can be used to vulcanize the cushion stock. When the elastomeric compound of the cushion stock consists essentially of polychloroprene, materials such as zinc oxide may be used to vulcanize the cushion stock. Where other diene polymers are used as a portion of the elastomeric compound, it is preferred that some sulfur vulcanization system be used.

The cushion stock preferably contains conventional reinforcing amounts of carbon black. Any conventional carbon black may be used. The preferred carbon blacks are HAF, FEF and SRF. The preferred level of black is 10 to 90 parts per 100 parts of elastomer. A range of from 20 to 50 parts of black per 100 parts of rubber is most preferred.

In a preferred embodiment of the present invention the cushion stock contains hydrated arorphous silica.

The hydrated amorphous silica used in accordance with the practice of this invention is used at a level of at least 5 parts, preferably at least 10 parts, most preferably at least 15 parts. The maximum level is 60 parts. Preferably the maximum is 30 parts. Most preferably the maximum level is 25 parts, all parts being by weight per 100 parts of elastomer.

In another preferred embodiment of the present invention, the cushion stock contains flexible filamentary material. The flexible filamentary material to be used in the practice of the present invention may be any flexible fiber of a shortened length which is generally used to increase the stiffness and hardness of cushion stocks. Such usage of fibers is noted in U.S. Pat. No. 3,051,212, column 4, lines 67 and 68. Well known fibers such as cotton linters and chopped or ground polyamides, such as nylon, regenerated cellulose such as rayon; and polyester fibers are exemplary of the types of the materials that may be used as flexible filamentary materials. The materials should be of such size that they can be dispersed uniformly throughout the cushion stock, and of such size to provide an increase in stiffness and hardness of the cushion stocks.

The flexible filamentary materials used in accordance with the practice of this invention are used at a level of at least 1 part, preferably at least 2 parts, most preferably at least 4 parts. The maximum level is 30 parts. Preferably the maximum is 15 parts. Most preferably the maximum level is 8 parts, all parts being by weight per 100 parts of elastomer.

A preferred flexible filamentary material is cotton flock, which is ground cotton fibres.

In a particularly preferred embodiment the cushion stock contains both filamentary material and hydrated amorphous silica.

The cushion stock may be prepared by any conventional means such as banbury mixing and open mill mixing. The method of combining the ingredients is not normally critical. However, to prevent premature vulcanization, it is preferred that a multi-pass system be used wherein the vulcanizing system, the N-(substituted oxymethyl)melamine and the thiazolidine are added in the final pass.

The methods of constructing the power transmission belts of the present invention are those conventionally used in the belt manufacturing industry.

The following includes an example of the present invention which illustrates, but does not limit the practice of the present invention.

Two cushion stock formulations are prepared using the following compounding recipes.

| Component | Amounts phr A | B |
|---|---|---|
| Polychloroprene (Type G) | 100.00 | 100.00 |
| Carbon black | 30.00 | 30.00 |
| Hydrated amorphous silica | 20.00 | 20.00 |
| Processing oil, plasticizer and processing aids | 20.50 | 20.50 |
| Metal oxides | 9.00 | 9.00 |
| Antidegradant | 3.00 | 3.00 |
| Flexible filamentary material | 6.00 | 6.00 |
| Hexakis(methoxymethyl)melamine | — | 1.00 |
| Chloropropyltriethoxysilane | — | 1.00 |
| 3-methylthiazolidine-thione-2 | — | 0.50 |

Compound B is a composition of the present invention. Compound A is not.

Two multi-ribbed V-belts are constructed having identical constructions. Belt X contains Compound A as its cushion stock. Belt Y contains Compound B as its cushion stock.

The durability of belts X and Y are measured according to the following test.

The belts are mounted on a 3-pulley arrangement. A tensioning force of 330 newtons is applied to the belt. The belt is run at 3500 RPM in a heating apparatus which is maintained at 120°±3° C.

As a result of the above test, belt Y is found to possess a durability superior to that of Belt X.

While levels of various components are recited herein, they are not to be considered restrictive of operative levels. Upper and lower levels as well as optimum levels can and do vary with the level and types of other materials used therewith. Proper levels can be determined by routine experimentation.

While certain prior art methods are taught herein for the preparation of components such as the melamines, these components, for purposes of the present invention, are not limited to their method of preparation.

While certain representative embodiments and details have been shown for the purpose of illustrating the invention it will be apparent to those skilled in this art that various changes and modifications may be made therein without departing from the spirit or scope of the invention.

I claim:

1. A rubbery composition comprising an elastomer, a melamine and an organosilane.

2. A rubbery composition according to claim 1 wherein the melamine has the following structural formula:

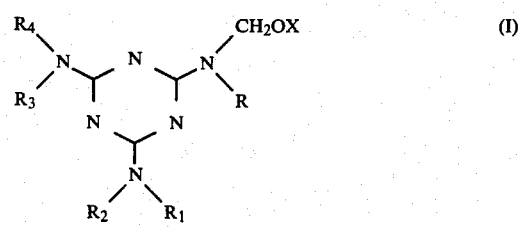

(I)

wherein X is selected from the group consisting of hydrogen and alkyl radicals having 1 to 8 carbon atoms, R, $R_1$, $R_2$, $R_3$ and $R_4$ are selected from the group consisting of hydrogen, alkyl radicals having 1 to 8 carbon atoms and -CH$_2$OX wherein X is as defined above, and the organosilane is selected from the group consisting of organosilanes having the following structural formulae:

$$R_{4-n}SiX_n \qquad (II)$$

wherein R is selected from the group consisting of alkyl radicals having 1 to 9 carbon atoms, alkenyl radicals having 1 to 9 carbon atoms, and alkoxy radicals having 1 to 9 carbon atoms. X is selected from the group consisting of chloro, chloroalkyl radicals having 1 to 9 carbon atoms, aminoalkyl radicals having 1 to 9 carbon atoms, and cycloalkenyl radicals having 6 to 8 carbon atoms, wherein n=1, 2 or 3; and $$(R_3SiX)_2S_m \qquad (III)$$

wherein R and X are as defined above; and m=1 to 4.

3. The rubbery composition of claim 2 wherein the composition is reinforced with carbon black.

4. The rubbery composition of claim 3 wherein the composition contains silica.

5. The rubbery composition of claim 4 wherein the composition contains flexible filamentary material.

6. The rubbery composition of claim 5 wherein the composition contains a thiazolidine.

7. The rubbery composition of claim 6 wherein the thiazolidine has the following structural formula:

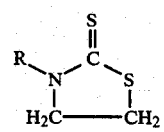

wherein R is selected from the group consisting of alkyl radicals having 1 to 4 carbon atoms, cycloalkyl radicals having 6 to 8 carbon atoms, aryl radicals having 6 to 10 carbon atoms, aralkyl radicals having 7 to 11 carbon atoms, furfuryl and morpholinoalkyl radicals, the alkyl portion of which contains 1 to 2 carbon atoms and

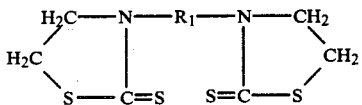

wherein $R_1$ is selected from the group consisting of alkylene radicals having from 1 to 4 carbon atoms, cyclohexylene and phenylene.

8. The rubbery composition of claim 7 wherein the elastomer is comprised of 85 to 100 parts by weight of polychloroprene and correspondingly 0 to 15 parts by weight of another rubbery diene polymer, all parts by weight being per 100 parts by weight of elastomer.

9. The rubbery composition of claim 8 wherein the polychloroprene is a sulfur-modified polychloroprene.

10. The rubbery composition of claim 9 wherein the elastomer consists essentially of sulfur-modified polychloroprene.

11. The rubbery composition of claim 10 wherein the flexible filamentary material is cotton.

12. The rubbery composition of claim 11 wherein the cotton is in the form of cotton flock.

13. The rubbery composition of claim 12 wherein the components of the composition are present in the following amounts, all parts being parts by weight per 10 parts by weight of elastomer.
(A) Melamine 0.2 to 6 parts
(B) Organosilane 0.2 to 4 parts
(C) Thiazolidine 0.2 to 2.5 parts
(D) Cotton flock 1 to 30 parts
(E) Hydrated Amorphous Silica 5 to 60 parts 14. The rubbery composition of claim 12 wherein the components of the composition are present in the following amounts, all parts being parts by weight per 100 parts by weight of elastomer.
(A) Melamine 0.4 to 3 parts
(B) Organosilane 0.4 to 2.5 parts
(C) Thiazolidine 0.4 to 1.8 parts
(D) Cotton flock 2 to 15 parts
(E) Hydrated Amorphous Silica 10 to 30 parts 15. The rubbery composition of claim 12 wherein the components of the composition are present in the following amounts, all parts being parts by weight per 100 parts by weight of elastomer.
(A) Melamine 0.5 to 1.5 parts
(B) Organosilane 0.5 to 1.5 parts
(C) Thiazolidine 0.5 to 1.5 parts
(D) Cotton flock 4 to 8 parts
(E) Hydrated Amorphous Silica 15 to 25 parts 16. A power transmission belt having a cushion, the cushion being comprised of the composition of claim 1.

17. A power transmission belt having a cushion, the cushion being comprised of the composition of claim 8.

18. A power transmission belt having a cushion, the cushion being comprised of the composition of claim 13.

19. The power transmission belt of claim 16 wherein the power transmission belt is a multi-ribbed V-belt.

20. The power transmission belt of claim 19 wherein the melamine is hexakis(methoxymethyl)melamine, the organosilane is chloropropyltriethoxysilane and the thiazolidine is 3-methylthiazolidine-thione-2.

21. A method of improving the durability of a power transmission belt possessing a cushion, wherein the improvement comprises fabricating the cushion portion from the rubbery composition of claim 1.

22. A method of improving the durability of a power transmission belt possessing a cushion, wherein the improvement comprises fabricating the cushion portion from the rubbery composition of claim 8.

23. A method of improving the durability of a power transmission belt possessing a cushion, wherein the improvement comprises fabricating the cushion portion from the rubbery composition of claim 13.

24. A method for improving the durability of a power transmission belt according to claim 21, wherein the power transmission belt is a multi-ribbed V-belt.

* * * * *